United States Patent [19]

Crookshanks

[11] Patent Number: 4,715,029

[45] Date of Patent: Dec. 22, 1987

[54] FDMA COMMUNICATIONS CHANNEL SYNCHRONIZER

[75] Inventor: Rex J. Crookshanks, Palos Verdes Estates, Calif.

[73] Assignee: Hughes Aircraft Company, Los Angeles, Calif.

[21] Appl. No.: 881,432

[22] Filed: Jul. 2, 1986

[51] Int. Cl.$^4$ ............................................... H04J 4/00
[52] U.S. Cl. ........................................ 370/70; 370/50; 370/100
[58] Field of Search ........................... 370/70, 50, 100; 375/39, 97

[56] References Cited

U.S. PATENT DOCUMENTS 4,304,000 12/1981 Bonnerot et al. ...................... 370/70
4,590,595 5/1986 Morimura ............................. 370/50

Primary Examiner—Joseph A. Orsino, Jr.
Attorney, Agent, or Firm—S. M. Mitchell; M. J. Meltzer; A. W. Karambelas

[57] ABSTRACT

A synchronizer (10) for frequency division multiple access signals (FDMA) permits synchronization on board a communications satellite without feedback to a multitude of ground-based user stations. Fourier transform processors (12, 13) sample the FDMA signal at half the FDMA baud rate and provide a series of pulses. Frequency translators (14, 15) frequency translate each pulse to frequency align across channels the content of one respective complete symbol segment to be isolated by bandpass filters (16, 17). A demodulator 18 provides a synchronized time division multiplexed output. Two channels alternately sample the FDMA signal to obtain full decoding.

A synchronization processor (20) is provided to ensure that the pulses undergo appropriate frequency translations. The synchronization processor detects TDM pulse amplitudes (at 22) and compares them (at 24) to obtain a discriminate which sets a translation frequency (at 26) for each FDMA channel. A frequency synthesizer (28) outputs this translation frequency with a dither superimposed thereon. This forms a phase lock loop for attaining and maintaining a proper translation frequency for each channel.

4 Claims, 4 Drawing Figures

FDMA COMMUNICATIONS CHANNEL SYNCHRONIZER

BACKGROUND OF THE INVENTION

The present invention relates to communications systems, and, more particularly, to a self-synchronizing demodulator for frequency division multiple access signals.

Communications systems for digital data often use a frequency division multiple access (FDMA) approach to transmitting data from different sources or users. In the FDMA approach, each user channel is assigned a discrete portion of the transmitted frequency spectrum so that many channels can be transmitted over a single transmission medium. In one approach, phase shift keying (PSK) techniques, including quadrature phase shift keying (QPSK) techniques, are employed in which a constant amplitude carrier has its phase angle varied to encode digital information.

In the past, the transmitted information has been recovered at a receiver using a separate PSK demodulator for each of the FDMA channels to provide individually accessible streams of data associated with each source.

The use of separate PSK demodulators to accommodate each of the FDMA channels, while adequate for some purposes, is impractical for applications where a receiver's weight and power are critical factors, for example, in regenerative satellites. This is especially true for a system is designed to process hundreds or thousands of channels.

More recently developed alternatives use a single receiver for multiple channels. The FDMA signals are typically transformed using a digital fast Fourier transform or a wide bandwidth surface acoustic wave (SAW) Fourier transform processor for transforming the FDMA signals into a time division multiplexed (TDM) signal of modulated data. The resulting TDM signal is demultiplexed to provide individually accessible streams of demodulated data.

In order for a single demodulator to effectively process multiple channels of data, the channels must be synchronized. In one approach, individual user stations adjust timing in response to error signals from a satellite or other central procession station. The feedback can be formed by dithering a symbol window back and forth to determine whether the symbol segments of each channel are early, late or on time. This technique involves sensing the amplitude of each demodulated symbol segment, comparing successive amplitudes corresponding to the given channel to form a discriminate, and generating a timing error signal.

This timing error signal is delivered to the transmitting source using multiplexing techniques. The users thus can adjust the data transmission timing of their communications channel in order to achieve collective synchronization of the symbol segments.

However, there are disadvantages to this approach to synchronization. In a satellite-based system, the number of user stations can be many times the number of channels, since it is expected that only a percentage of the stations need to access the satellite at any given time. Furthermore, these stations are located at the "consumer" end of the satellite communications system, where cost and simplicity are critical. Synchronization of user stations requires each user station to include means for receiving and interpreting the error signals, and means to adjust timing. Furthermore, the round trip of the error signal followed by a corrected transmission signal introduces a time delay during which communications must continued impaired. Finally, the error signal consumes valuable communications bandwidth.

One object of the present invention is to synchronize FDMA channels centrally, e.g., on board a communications satellite. Thus providing the advantages of a single demodulator system without the need for user-based synchronization.

SUMMARY OF THE INVENTION

In accordance with the present invention, each channel of a Fourier transformed FDMA signal is frequency translated and bandpass filtered to provide a synchronized TDM output suitable for demodulation. The FDMA signal is sampled with a window two symbol periods in duration so that at least one complete symbol period is represented for each channel. This sample is Fourier transformed to produce a series of pulses, each pulse corresponding to one of the FDMA channels. At least one frequency sub-band of each pulse represents a complete bit of information from the respective FDMA channel. The pulses are filtered so that only one complete bit of information for each channel is passed for demodulation or output. Preferably, a second window is used to sample the incoming FDMA signal on a staggered basis with respect to the first window so that every symbol of every channel is sampled.

If the incoming FDMA signals are not synchronized, the complete symbols in the Fourier transformed format will be at different sub-bands. These sub-bands are aligned through frequency translation. Frequency translation is applied by a frequency translator or mixer in response to a signal from a frequency synthesizer. Assuming that signal timing remains stable over many symbol periods, the correct translation frequency can be determined through successive approximations.

These successive approximations are performed by dithering the frequency synthesizer for each pulse channel to form a discriminate. When the frequency sub-band is properly translated, the output amplitude is maximal. Thus, amplitude differences at the filter output can be used to adjust the synthesizer frequency in the appropriate direction.

In accordance with the foregoing, and the following detailed description, a synchronizing system for FDMA demodulation is provided. The "centrally" located synchronization avoids correction delays, bandwidth usage and multiplicity of synchronization problems of the remote synchronization approach. Yet, the need for a multiplicity of demodulators in the central system is obviated. Accordingly, the present invention provides for an improved satellite-based communications system.

DESCRIPTION OF THE PREFERRED EMBODIMENTS

Figure 1:
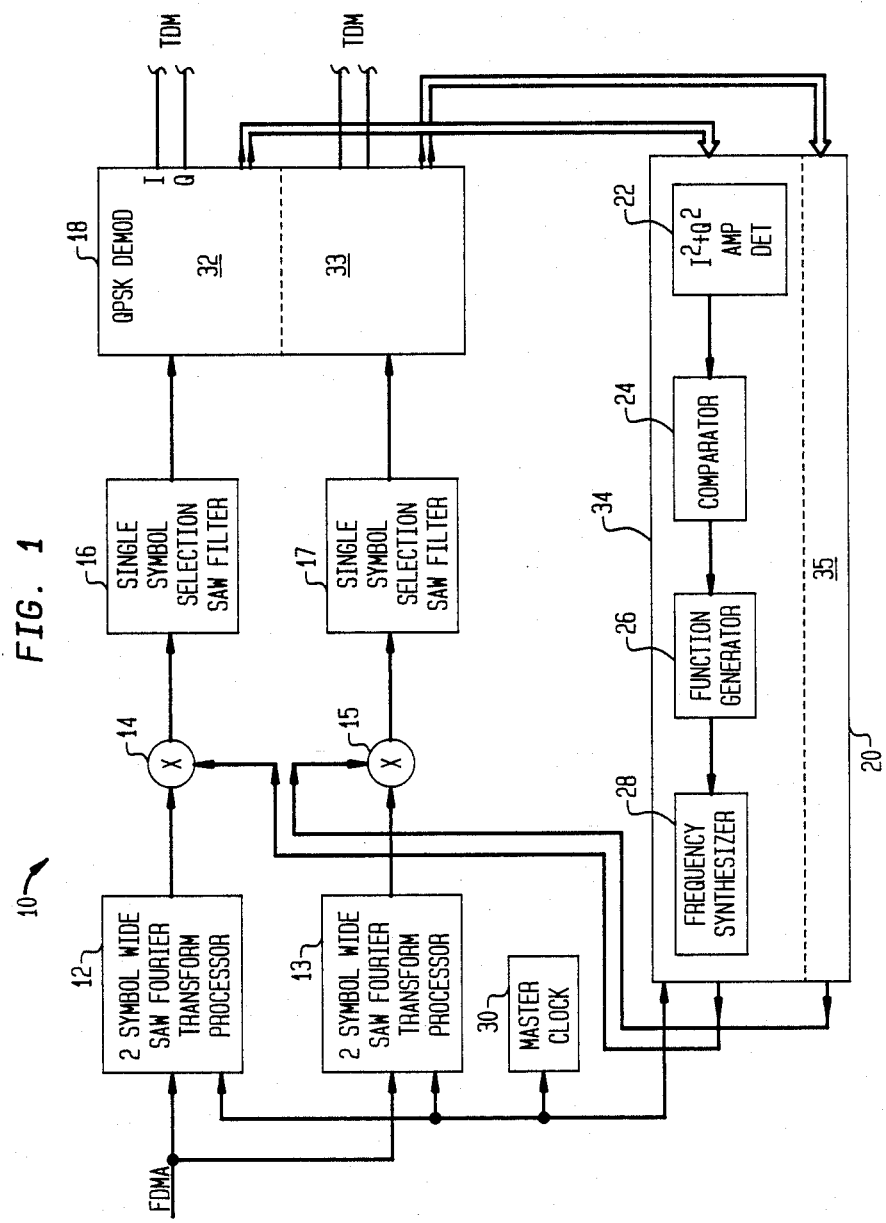
FIG. 1 is a block diagram of a synchronization processor in accordance with the present invention.

A synchronization processor 10 for an FDMA demodulator includes a pair of two-symbol wide Fourier transformers 12, 13, frequency translators 14, 15, bandpass filters 16, 17, a QPSK demodulator 18, a discriminate forming means 20 including a frequency synthesizer 28 for providing on-going synchronization of the signal to be demodulated, as illustrated in FIG. 1. The discriminate forming means can be a dither synchronization processor including an amplitude detector 22, an amplitude comparator 24, and a function generator 26 for providing an updated frequency plus dither control signal to the frequency synthesizer 28. The frequency synthesizer output is directed to the translators 14 and 15 to align complete symbol segments prior to filtering. A master clock 30 provides internal synchronization among the processor components.

Figure 2:
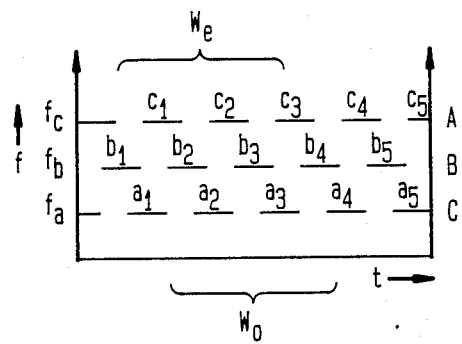
FIG. 2 is a frequency-time waveform chart of the FDMA input to the processor of FIG. 1.

Three of several hundred channels of the FDMA input to the synchronization processor are illustrated in FIG. 2. Since no prior synchronization is presumed, the symbol periods of the three channels are shown staggered. Each individual symbol segment $a_i$, $b_i$, $c_i$ of the channels A, B, C includes PSK information, although several well-known alternative encoding schemes are applicable. Two windows $W_e$ and $W_o$ are indicated, each being two symbol periods long. The windows $W_e$ and $W_o$ are treated as even and odd windows which are alternately applied to ensure complete sampling of the incoming signal. The windows $W_e$ and $W_o$ are staggered one symbol period apart.

Each window $W_e$, $W_o$ defines a sample of the FDMA input to be Fourier transformed by the respective two-symbol wide surface acoustic wave (SAW) Fourier transform processor 12, 13. The Fourier transform can alternatively be applied digitally. Processor 12 operates on the content of window $W_e$ while processor 13 operates on the content of window $W_o$.

The content of $W_e$ includes a fragment of symbol segment $a_1$, all of symbol segment $a_2$, and a fragment of symbol $a_3$. $W_e$ also includes all of symbol segments $b_2$ and $b_3$. $W_e$ further includes a fragment of $c_1$, all of $c_2$ and a fragment of $c_3$. By extrapolation, it can be seen that $W_e$ includes at least one complete symbol segment of each FDMA channel, e.g. $a_2$, $b_2$ and $c_2$. Complete symbol segment $b_3$ is included in both windows $W_e$ and $W_o$. $W_o$ also includes complete symbol segments $a_3$ and $b_3$.

Figure 3:
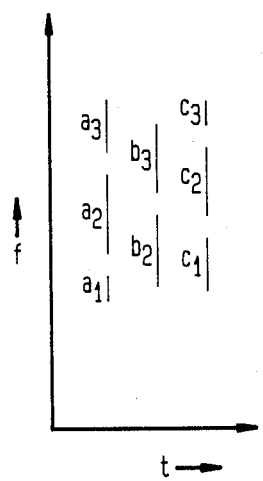
FIG. 3 a time-frequency waveform chart of the FDMA signal of FIG. 2 after sampling and Fourier transformation.

The Fourier processors 12 and 13 operate in a similar manner and effectively reverse the relationships of frequency and time, as indicated for $W_e$ in FIG. 3. The corresponding symbol segments, $a_i$, $b_i$, and $c_i$ are so marked, but are now in the form of pulses rather than extended sine waves. The pulses occur at times $t_A$, $t_B$ and $t_C$ which correspond to the original frequencies $f_A$, $f_B$ and $f_C$ in FIG. 2. Note that the complete symbol segments of $W_e$ in FIG. 2 are complete symbol segments in FIG. 3, and the fragments of window $W_e$ in FIG. 2 are fragments in FIG. 3.

The output of Fourier transform 13 appears almost identical to the output of 12 shown in FIG. 3. The actual segments shown would all be incremented so that the information contents or phases of the individual segments could be different.

The frequency translators 14 and 15 frequency align the complete symbol segments of the respective channels. Each pulse is shifted the amount required to align the complete symbol with the bandwidth of the respective bandpass filter 16, 17. The results of the frequency translation by 14 are shown in FIG. 4.

Figure 4:
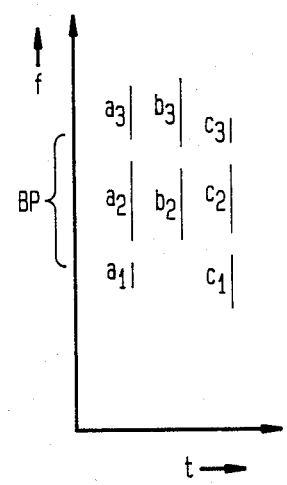
FIG. 4 is a time-frequency waveform chart of the signal of FIG. 3 after frequency translation.

Filter 16 filters out all frequency components outside the brackets BP in FIG. 4, thus passing only the information of complete symbol segments $a_2$, $b_2$ and $c_2$. Likewise, filter 17 passes only complete symbol segments $a_3$, $b_3$ and $c_3$. The illustrated single symbol selection bandpass filters 16 and 17 are surface acoustic wave (SAW) filters. The sampling is iterated so that the even channel passes $a_4$, $b_4$ and $c_4$ on the next cycle, while the odd channel passes $a_5$, $b_5$ and $c_5$ on the next cycle.

The demodulator 18, shown in FIG. 1 as having separate sections 32, 33 for each of the even and odd processing channels, isolates in-phase (I) and quadra-phase (Q) components of the pulses exiting the bandpass filters 16 and 17. These components allow amplitude and phase reconstruction of each pulse.

The above described passing of complete symbol segments through the bandpass filters 16 and 17 depends on the exact frequency alignment of the symbols by the sequence of translation frequency inputs to frequency translators 14 and 15. Since successive symbol segments within a channel are evenly spaced in time, once the proper function frequency for a given channel is established, it can be assumed to apply for successive symbols. However, it is necessary to set an appropriate function frequency to begin with, and it is necessary to calibrate repeatedly in case of drift or changes in timing.

Initially, the frequency synthesizer 28 provides an output dithered between successive even time windows and about an intermediate translation frequency since no error history is provided to adjust the frequencies of the signals. In this case, the signals passing through, for example, the even channel bandpass filter 16, could have a pattern like that shown in FIG. 3 rather than that shown in FIG. 4. Thus, rather than passing $a_2$ only, a part of $a_2$ and a part of $a_3$ are passed. If $a_2$ and $a_3$ have different phases, then the demodulator output corresponding to channel A will have its energy spread between two phases. Thus, neither phase is represented at full amplitude.

Assuming the frequency synthesizer is dithered downwardly during the illustrated window $W_e$, the representation of $a_3$ in the output is increased relative to the case without dithering. This will increase the spreading and decrease the amplitude of the output. On the successive $W_e$, $a_2$ and $a_3$ are replaced by $a_4$ and $a_5$. Given an upward dither, less of $a_5$ will be represented in the output relative to the amount of $a_3$ represented. Thus, there will be less spreading and a greater output amplitude.

The difference in amplitude between the first $W_e$ and the second $W_e$ is a discriminate indicating the alignment of the symbol segments with the bandwidth of the bandpass filter 16. Since the upward dither during the second $W_e$ caused the greater amplitude, a positive discriminate is formed and the translation frequency about which the dithering is conducted is increased for succeeding even windows. Adjustment of the frequency synthesizer 28 continues until both phases of the dithering produce substantially maximal amplitudes.

The adjustments proceed concurrently for each FDMA channel and each channel will effects its own characteristic translation frequency. The translation frequencies will be stepped through during each window, e.g. the characteristic frequency for channel A will be applied at $t_A$, the characteristic frequency for channel B will be applied at $t_B$, and the characteristic frequency for channel C will be applied at $t_C$.

The adjustments in frequency translation can be performed independently for the odd and even channels as illustrated. Alternatively, a single frequency step function can be applied successively to both channels. In fact, the dithering can be between the two channels. The setting of the frequency step function or functions is performed by function generator 26 of the dither synchronization processor 20.

As shown in FIG. 1, the dither synchronization processor 20 is a single device with two channels 36 and 38. Alternatively, it can be two processors or a single processor with one channel. Each channel of the illustrated synchronization processor 20 includes an $I^2+Q^2$ amplitude detector and a comparator which stores the detected amplitude for comparison with the next amplitude input.

The comparator output is the discriminate used by the function generator 26 for the frequency synthesizer. The function generator 26 uses the discriminate to adjust the step function at the step corresponding to the frequency channel caused by a non-zero discriminate. The function generator 26 also superimposes the dither function on the step function. The function generator 26 applies the superimposed result to step the frequency synthesizer 28 to attain and maintain synchronization.

While the above embodiments are illustrative, many alternatives are encompassed by the present invention. In particular, many functions can be effected in either digital or analog form. The various functions applied to the odd and even channels can be applied by separate devices, two-channel devices, or a single channel devices with the odd and even channels multiplexed. These as well as other modifications and variations are within the scope of the following claims.

What is claimed is:

1. A method of synchronizing an FDMA signal constituted by nonsynchronized channels having a common predetermined symbol period, said method comprising the steps of:
   (a) receiving said FDMA signal;
   (b) sampling said FDMA signal over pairs of adjacent symbol periods to obtain samples;
   (c) Fourier transforming each said sample so as to obtain a series of pulses extending over a common bandwidth;
   (d) frequency translating each of said pulses by a translation frequency, said translation frequency being the sum of a respective frequency and a dither having a cycle two symbol periods in duration, so that the frequency translated pulses share a common frequency range substantially half that of their common bandwidth;
   (e) filtering said pulses to exclude frequencies outside said common frequency range;
   (f) detecting and storing the amplitudes of said pulses;
   (g) forming a discriminate for each FDMA channel by comparing amplitudes of successive pulses corresponding to that channel; and
   (h) adjusting each said translation frequency of step d in response to said discriminate.

2. The method of claim 1 conducted in staggered parallel by obtaining a second set of samples displaced one symbol period from those obtained in step b.

3. A system for synchronizing an FDMA signal constituted by nonsynchronized channels having a common predetermined symbol period comprising:
   receiving means for receiving an FDMA signal;
   sampling means for obtaining two-symbol period duration samples of said FDMA signal;
   transform means for Fourier transforming said samples to obtain pulses having a common bandwidth;
   translating means for frequency translating each of said pulses by a translation frequency so that said pulses substantially share a common frequency range extending one half their common bandwidth;
   filtering means for filtering out pulses frequencies outside of said common frequency range;
   amplitude detection and storage means for detecting and storing the amplitudes of said pulses;
   comparator means for forming discriminates by comparing the amplitudes of pulses from different symbol periods for each channel; and
   a function generator for storing and adjusting a respective function frequency for each FDMA channel, said function generator adjusting each respective function frequency in response to respective discriminates from said comparator means;
   dither means for producing a dither having a frequency corresponding to that of said sampling means; and
   a frequency synthesizer for synthesizing translation frequencies, each translation frequency being a combination of said dither and a respective function frequency, said frequency synthesizer being synchronized with said sampling means so that each pulse is translated by the respective translation frequency for the respective FDMA channel.

4. The system of claim 3 further comprising a second sampling means for obtaining samples two symbol segments in duration, said second sampling means being delayed one symbol segment with respect to said first sampling means, said second sampling means being coupled to like components so that each symbol segment of each channel can be sampled.

* * * * *